(12) United States Patent
Merker

(10) Patent No.: US 12,505,102 B2
(45) Date of Patent: *Dec. 23, 2025

(54) BLOCKED INDEX JOIN

(71) Applicant: SAP SE, Walldorf (DE)

(72) Inventor: Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,361

(22) Filed: Aug. 29, 2024

(65) Prior Publication Data

US 2024/0419668 A1    Dec. 19, 2024

Related U.S. Application Data

(63) Continuation of application No. 17/740,151, filed on May 9, 2022, now Pat. No. 12,105,709.

(51) Int. Cl.
*G06F 16/245* (2019.01)
*G06F 16/2453* (2019.01)

(52) U.S. Cl.
CPC .. *G06F 16/24544* (2019.01); *G06F 16/24537* (2019.01); *G06F 16/24569* (2019.01)

(58) Field of Classification Search
CPC ....................................... G06F 16/2453–24569
See application file for complete search history.

*Primary Examiner* — Robert W Beausoliel, Jr.
*Assistant Examiner* — Nirav K Khakhar
(74) *Attorney, Agent, or Firm* — Mintz Levin Cohn Ferris Glovsky and Popeo, P.C.

(57) ABSTRACT

A method, a system, and a computer program product for executing a blocked index join. One or more join values for joining data stored in a database in response to a query for accessing data stored in the database are identified. The database stores data in a plurality of tables. Each table has a plurality of columns and a plurality of rows. A mapping of one or more rows in the plurality of rows corresponding to one or more join values to a number of rows including one or more join values is identified. Based on the mapping, a join of one or more join values based on the rows including one or more join values is executed. The joined values are outputted.

20 Claims, 12 Drawing Sheets

BLOCKED INDEX JOIN

CROSS REFERENCE TO RELATED APPLICATIONS

This application is a continuation of U.S. patent application Ser. No. 17/740,151 filed May 9, 2022, entitled "BLOCKED INDEX JOIN." The disclosure of which is incorporated herein by reference in its entirety.

TECHNICAL FIELD

This disclosure relates generally to data processing and, in particular, to execution of a blocked index join for the purposes of query execution.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance, including using existing methods for performing blocked index joins in response to queries.

SUMMARY

In some implementations, the current subject matter relates to a computer implemented method for executing a blocked index join. The method may include identifying, using at least one processor, one or more join values for joining data stored in a database in response to a query for accessing data stored in the database, where the database may store data in a plurality of tables and each table may have a plurality of columns and a plurality of rows. The method may also include generating a mapping of one or more rows in the plurality of rows corresponding to one or more join values to a number of rows including one or more join values, executing, based on the mapping, a join of one or more join values based on the rows including one or more join values, and outputting joined one or more values.

In some implementations, the current subject matter may include one or more of the following optional features. The identifying may include identifying a block of one or more join values in the database. The identifying may also include identifying one or more unique values in one or more join values and sorting the identified unique values, and executing a lookup of value identifiers in one or more dictionaries associated with the database corresponding to the sorted identified unique values.

In some implementations, the method may also include determining one or more count values associated with each of the value identifiers, and determining one or more row positions in the plurality of rows corresponding to the determined count values and the corresponding value identifiers. The generating may include generating an index corresponding to the determined number of rows and the determined row positions, and generating the mapping, using the generated index.

In some implementations, the method may include generating a response to executing the query for accessing data stored in the database using the outputted joined values.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
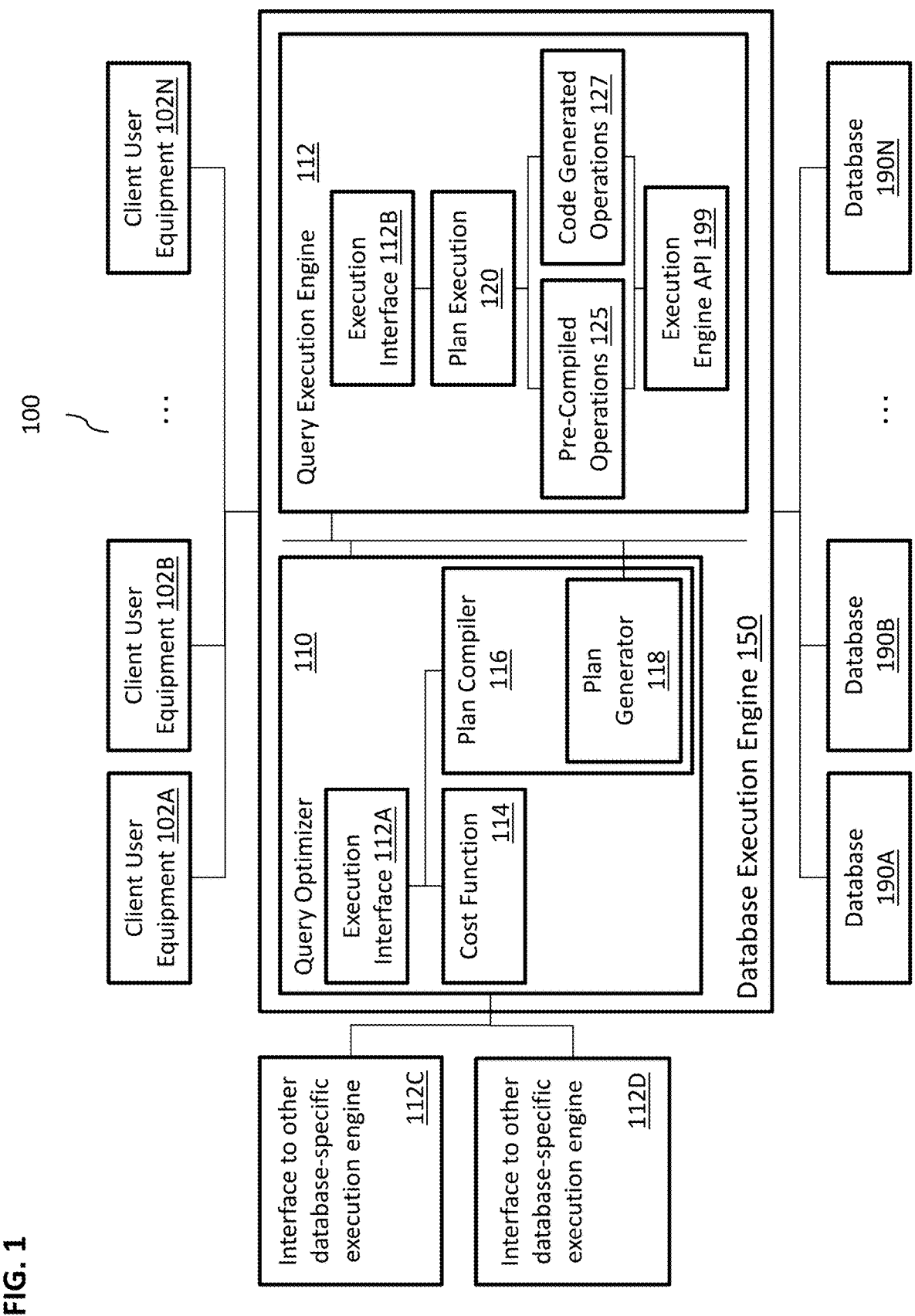
FIG. 1 illustrates an exemplary block diagram for a system, according to some implementations of the current subject matter.

To address these and potentially other deficiencies of currently available solutions, one or more implementations of the current subject matter relate to methods, systems, articles of manufacture, and the like that can, among other possible advantages, provide an ability to execute a blocked index join during query execution processes.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, in accordance with some example implementations. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/ instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID (or "valueid" or "valueID", which, hereinafter, will be used interchangeably) of "1" and an indexvector scan with a valueid obtained from the dictionary look up, which results in a document ID (or "documentid" or "documentID", which, hereinafter, will be used interchangeably) list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls Made On Database API |
|---|---|
| 1) TableScan (Filter X = 1) | dictionary lookup column "X" for the "value of ID of 1" indexvector scan with a valueid from the lookup, which results in a document ID (docid) list that identifies one or more rows in table "1" |
| 2) Materialization (Columns A, B) | for each docid, lookup value IDs (valueids) for columns A + B for the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases.

This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

Figure 2:
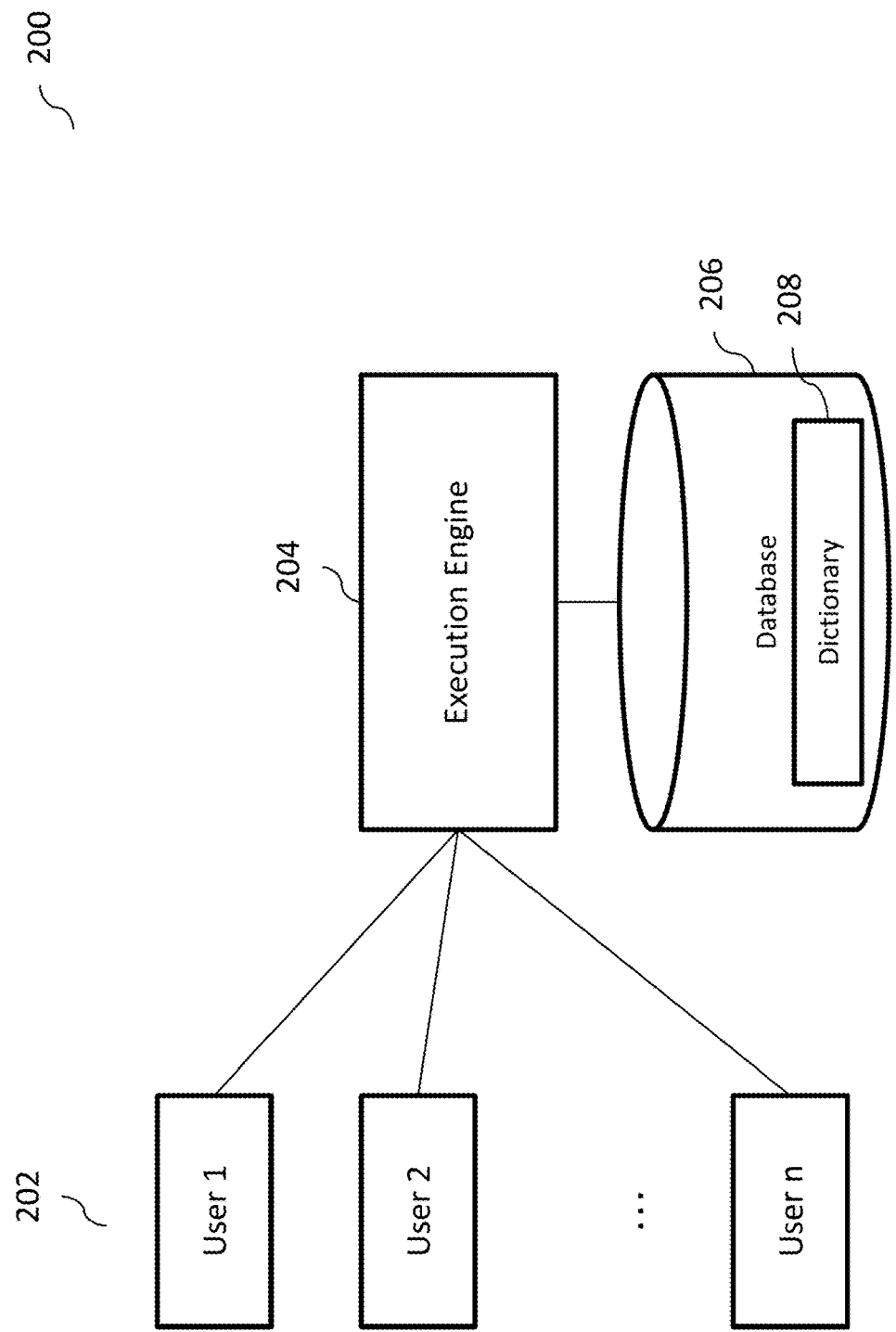
FIG. 2 illustrates an exemplary system for executing a blocked index join, according to some implementations of the current subject; matter

FIG. 2 illustrates an exemplary system 200 for executing a blocked index join, such as, for example, in response to receiving a query, according to some implementations of the current subject matter. The system 200 and/or any portions thereof may be configured to be incorporated into the system 100 shown in FIG. 1.

The system 200 may be configured to operate in one or more clustered computing environments (e.g., Kubernetes), one or more cloud environments, etc. It may include one or more users, entities, applications, etc. 202 (e.g., user 1, user 2, . . . , user n, etc.), which may include one or more end-users, administrator users, etc. that may be configured to access system 200 using one or more browsers, user interfaces, application interfaces, and/or any other interfaces. It may also include a process engine/system 204. The engine 204 may be configured to be similar to the database execution engine 150 shown in FIG. 1. It may include one or more computing elements (which may, for example, include one or more processors, one or more servers, one or more computing engines, one or more memory and/or storage locations, one or more databases, etc.). The engine 204 may also be communicatively coupled one or more databases 206 that may be used to execute a blocked index join. The database 206 may store various data that may be used in response to a query provided by one or more users 202 to the engine 204. The database 206 may also include a dictionary 208. Various components of the system 200 may be communicatively coupled using various communication protocols, including but not limited to REST protocol, HTTP protocol, OData protocol, SOAP protocol, etc. Moreover, the system 200 may be configured to include one or more application programming interfaces for ensuring connectivity among various elements of the system 200.

The engine 204 may include a processor, a memory, and/or any combination of hardware/software, and may be configured to allow one or more users 202 to communicate with the engine 204, such as, for the purposes of receiving a query to access certain data in the database 206. The engine 204 and/or database 206 may include one or more or specific software applications, one or more computing processes, one or more computing steps that may be executed by one or more processors, along with any associated data and/or content, and/or any configuration data that may specify one or more functions and/or features of the software application(s), data and/or content. In some cases, the engine 204 and/or database 206 may be configured to rely on data, functions and/or features (and/or any combination thereof) of a computing component such that the process is an integration and/or a combination of one or more computing components, processes, etc. A computing component may refer to a software code that may be configured to perform a particular function, a piece and/or a set of data (e.g., data unique to a particular accounting process and/or data available to a plurality of accounting processes, and/or any other processes) and/or configuration data used to create, modify, etc. one or more software functionalities. The engine 204 may include one or more artificial intelligence and/or learning capabilities that may rely on and/or use various data, e.g., various existing parameters, historical data associated with querying data, users, caching and/or cached data, dependencies, etc.

The elements of the system 200 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Moreover, the elements of the system 200 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

Figure 3:
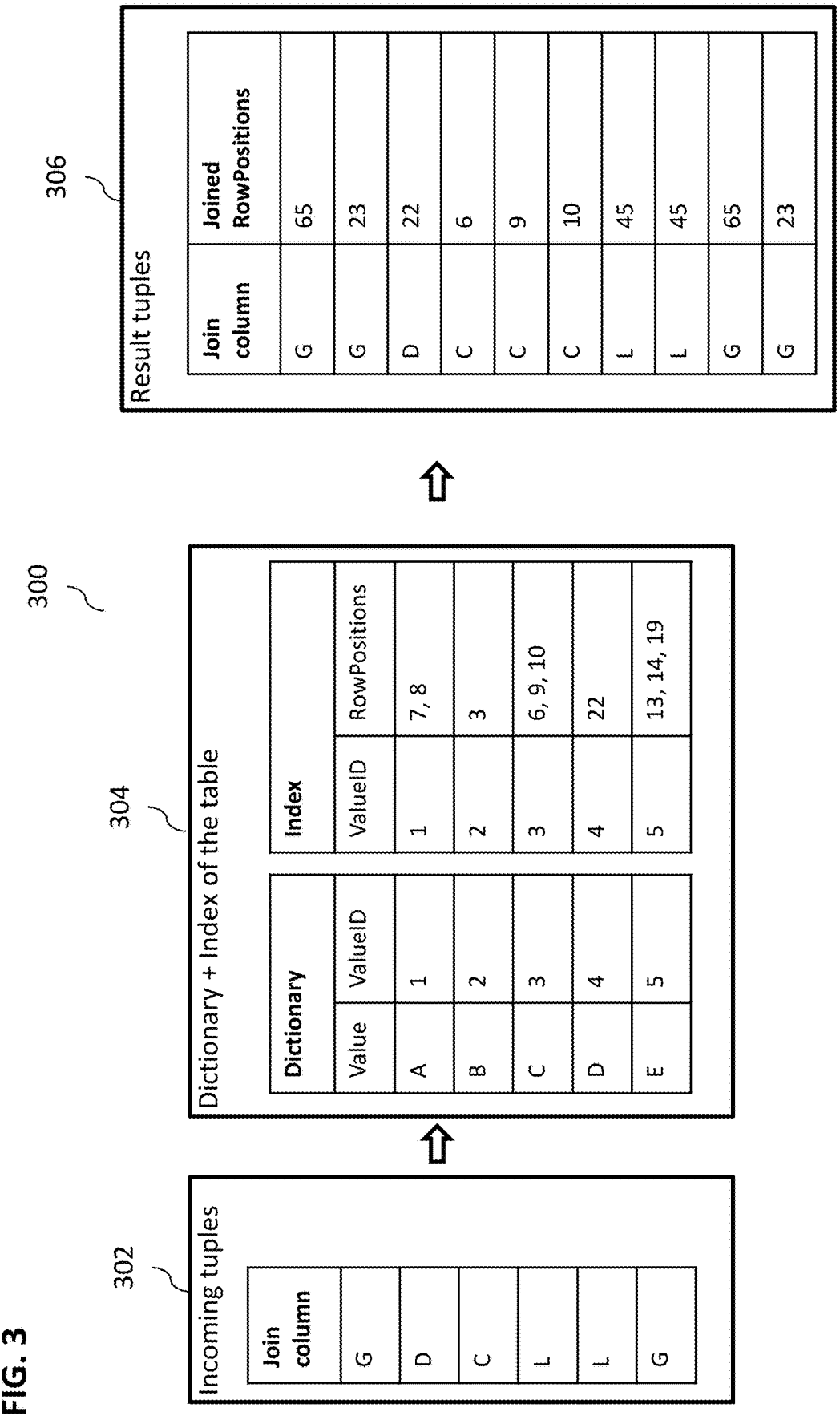
FIG. 3 illustrates an existing index join process.

FIG. 3 illustrates an existing index join process 300. As part of the process 300, one or more incoming tuples 302 may be processed. For example, the tuples 302 may be received by the engine 204 (shown in FIG. 2) from a database 206. The tuples 302 may specify particular join columns. For example, a join column (in a table) may have join values G, D, C, L, L, G.

The index join process 300 may, for each received tuple, then perform a lookup of join column (e.g., having join values G, D, C, L, L, G) in a dictionary component 304 (e.g., which may be part of the database 206) to determine a ValueID. The ValueID is then used to perform a lookup in the index to determine a list of RowPositions corresponding to the ValueID (e.g., ValueID of 1 corresponds to RowPositions 7, 8; ValueID of 2 corresponds to the RowPosition 2, etc.).

The process 300 then generates result tuples 306. In the result tuples 306, each join column in the incoming tuples 302 corresponds to one or more joined RowPositions (e.g., join value G corresponds to joined RowPositions 65 and 23; join value D corresponds to joined RowPosition 22; etc.). However, the join index process 300 is computationally expensive (e.g., each may involve random memory access, which are expensive), as for each lookup operation in the index in the data store, a data lock must be executed. Moreover, during the process 300, same values may be looked up multiple times, thereby making the process 300 inefficient.

FIGS. 4a-e illustrate an exemplary process 400 for executing a blocked index join, according to some implementations of the current subject matter. The process 400 may be executed using system 100 shown in FIG. 1 and/or system 200 shown in FIG. 2. The process 400 may be executed in response to a query seeking data from a database 206 shown in FIG. 2.

The process 400 may be initiated upon receiving one or more incoming and/or input tuples 302 that may identify a portion or a block of join columns (e.g., a join column with join values G, D, C, L, L, G) that may be responsive to a query. This allows reduction of memory usage as fewer than all columns are materialized as part of any intermediate results responsive to the query.

Figure 4A:
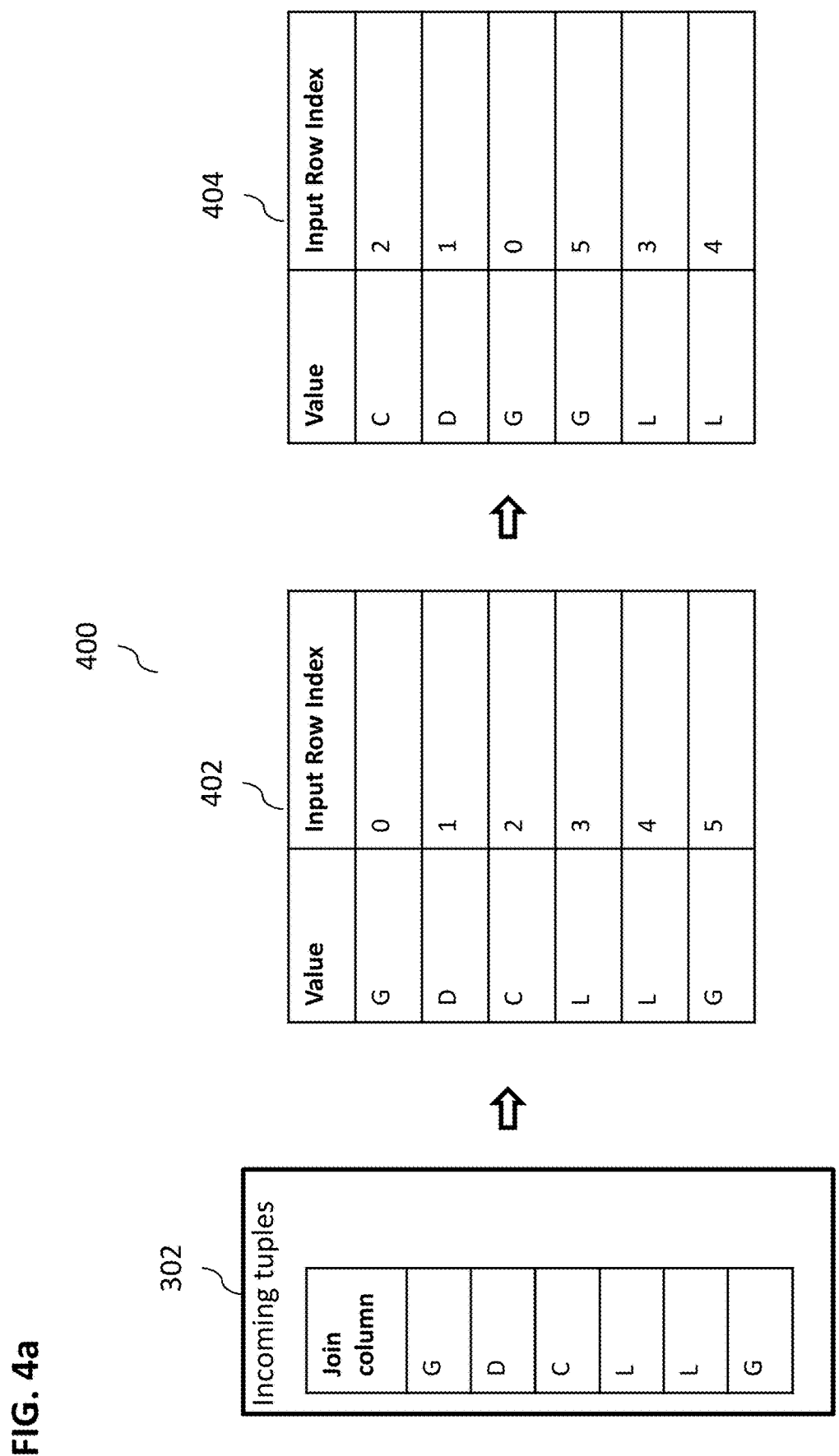
FIGS. 4a-e illustrate an exemplary blocked index join process, according to some implementations of the current subject matter.

Using the block of input tuples 302, the engine 204 may be configured to generate a table 402 that may include one or more join values corresponding to the identified columns in the block and corresponding input row indexes. As shown in FIG. 4a, a join value G may correspond to an input row index 0; a join value D may correspond to an input row index 1; etc. The table 402 may then be sorted using the join value to generate a sorted table 404. For example, the sorting may be executed in alphabetical order (as shown in the table 404). As can be understood, any desired type of sorting may be executed.

Figure 4B:
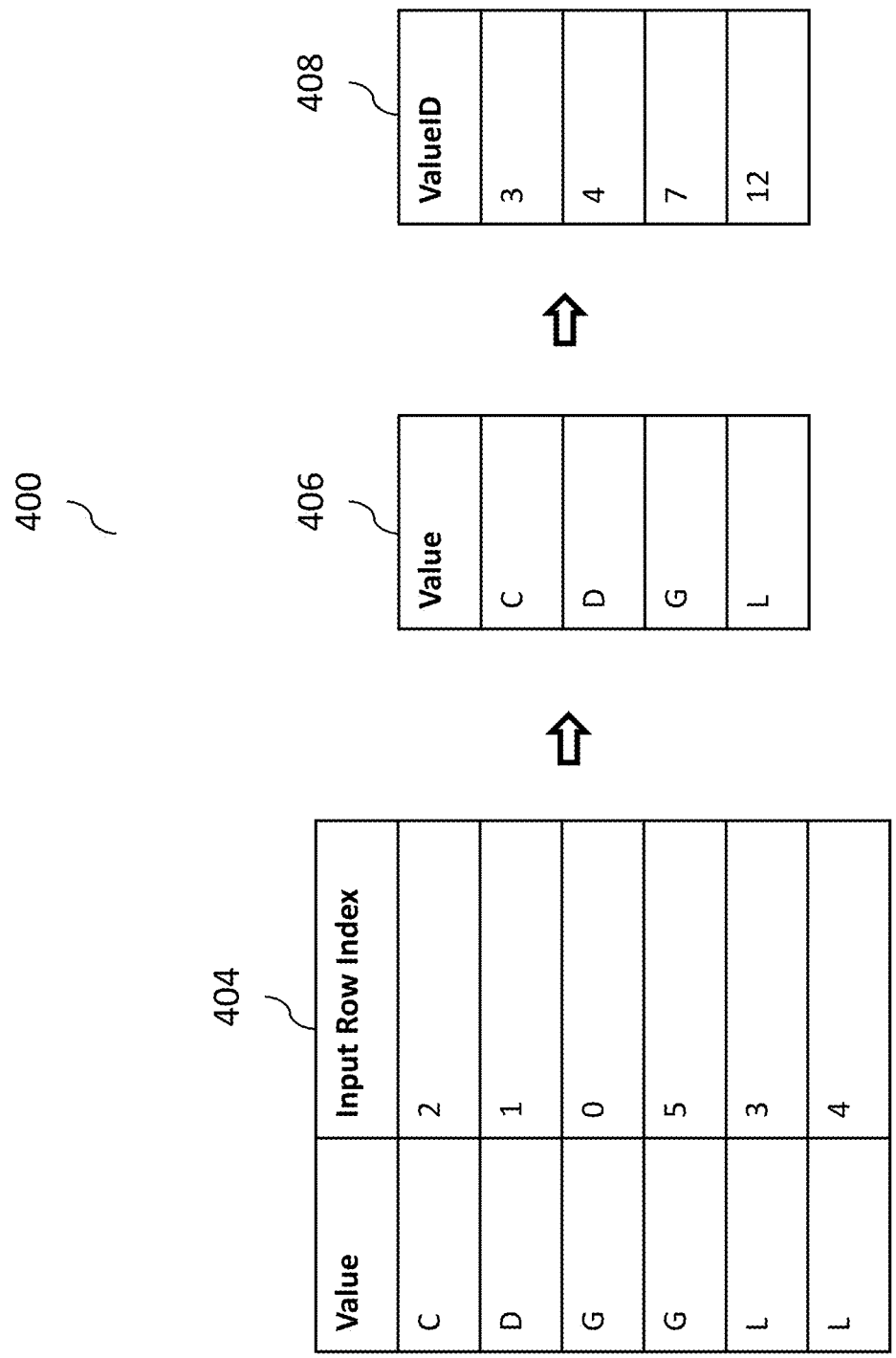

The process 400 may then scan the table 404 to generate a list of unique values 406, as shown in FIG. 4b. Since the table 404 included two join values of G and two join values of L, the table 406 may now include one entry for each of these join values (i.e., table 406 may include join values C, D, G, L rather than C, D, G, G, L, L as in table 404). The dictionary 208 may be used by the process 400 to lookup individual valueIDs corresponding to each of the join values C, D, G, L to generate a ValueID table 408. For example, the join value C may correspond to valueID 3; join value D may correspond to valueID 4; etc. Some of the advantages of performing the above sorting and generation of a list of unique values prior to lookup operations may reduce the number of lookup operations as well as may allow performing of lookup operations in the dictionary in a sequential access pattern manner, because the dictionary is also sorted.

Figure 4C:
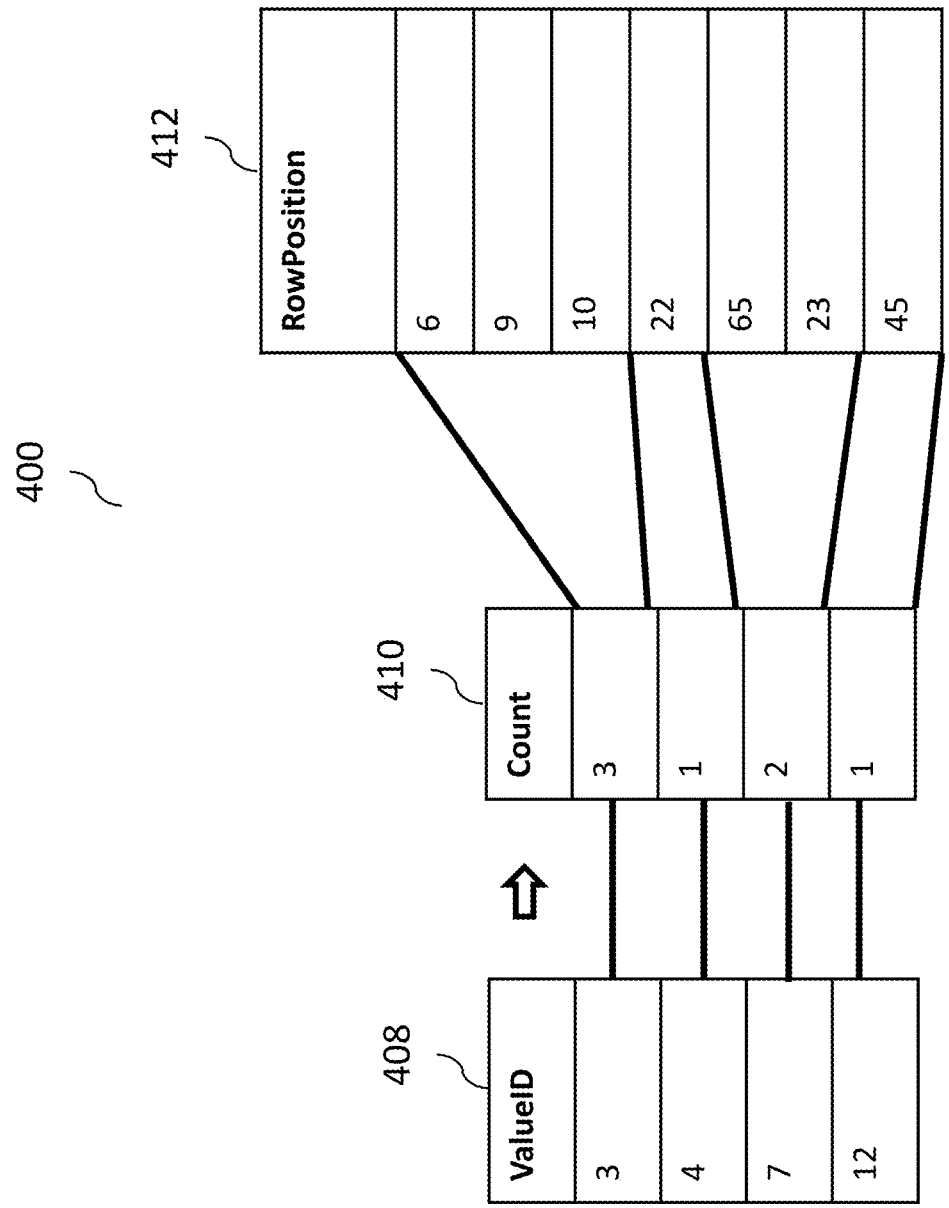

For each valueID in the table 408, a lookup of the valueIDs may be executed by the engine 204 in an index of the database 206. The engine 204 may be configured to execute a blocked call to the index in the database 206, where all valueIDs in the block may be looked up all at once (rather than one at a time as in the conventional index join process 300). As a result of the blocked lookup, the engine 204 may be configured to output a table 410 and a table 412. The table 410 may include a number of resulting row positions (RowPosition) for each row corresponding to each valueID. The table 412 may include such row positions. The system 200 may also track (and/or include a mapping) of valueIDs, counts, and RowPositions. For example, a valueID of 3 may correspond to count 3 (i.e., three row positions), which in turn, corresponds to RowPosition values of 6, 9, and 10, as shown in FIG. 4c. Similarly, a valueID of 4 may correspond to count 1 (i.e., one row position), which in turn, corresponds to RowPosition value of 22, etc.

Figure 4D:
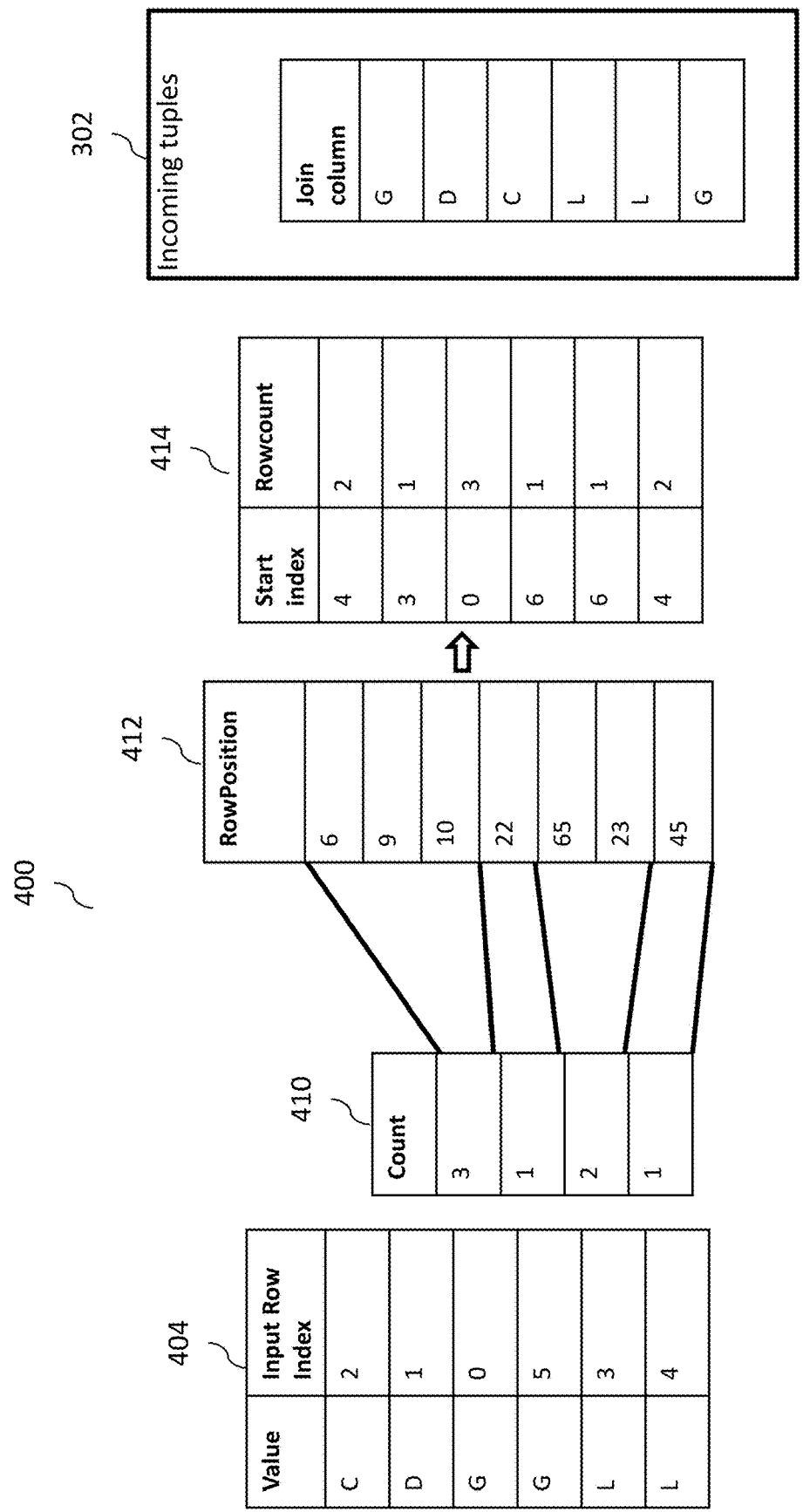

As stated above, using the process 400, the engine 204 may be configured to generate a mapping of input rows to row counts and start index in RowPositions, as shown in table 414 in FIG. 4d. To generate the mapping, the engine 204 may be configured to perform a scan of data using a join value, input row index table 404 as well as row count table 410 and row positions table 412. During the scan, the engine 204 may be configured to evaluate count values (table 410) and rowpositions (table 412) whenever values in the (join value, input row index (table 404)) changes. As a result of the scan, table 414 containing a start index and a rowcount values may be generated. For example, start index 4 may correspond to rowcount 2; start index 3 may correspond to rowcount value 1; etc. Thus, table 414 may correspond to the incoming tuples list, whereby the first entry in table 414 may correspond to the first entry in the input tuples 302. This means that the first input tuple may map to start index 4, rowcount 2.

Figure 4E:
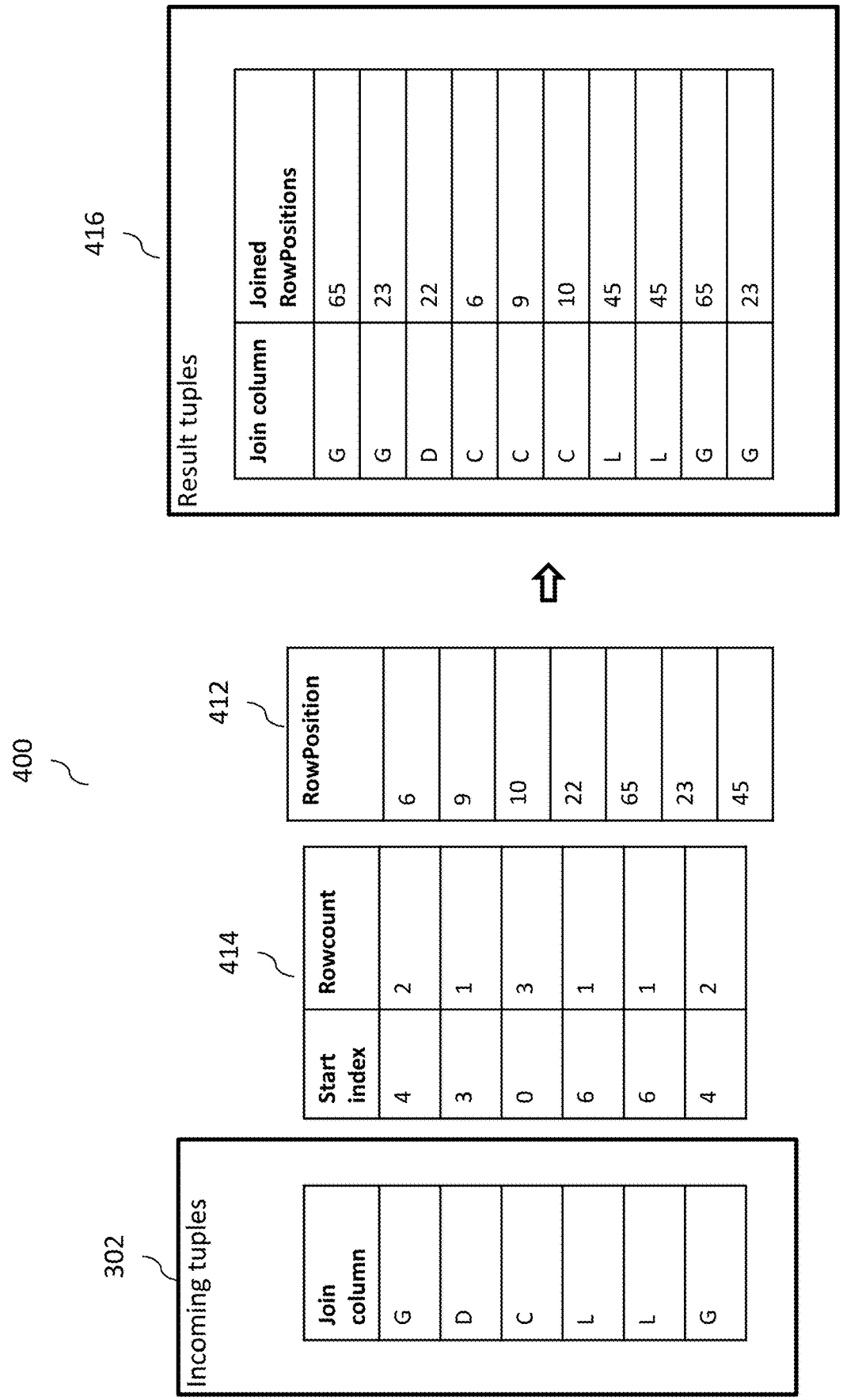

As shown in FIG. 4e, the engine 204 may be configured to generate a result tuples table 416 that may include join columns (identified in the input tuples table 302) and joined RowPositions (determined based on the tables 414 and 412). Thus, as shown in Table 416, join value G (corresponding to count 2 in table 410) may include joined row positions 65 and 23 (e.g., as shown by table 412); join value C (corresponding to count 3 in table 410) may include joined row positions 6, 9, and 10 (e.g., as shown by table 412); join value L (corresponding to count 1 in table 410) may include join row position 45 (e.g., as shown by table 412).

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 5:
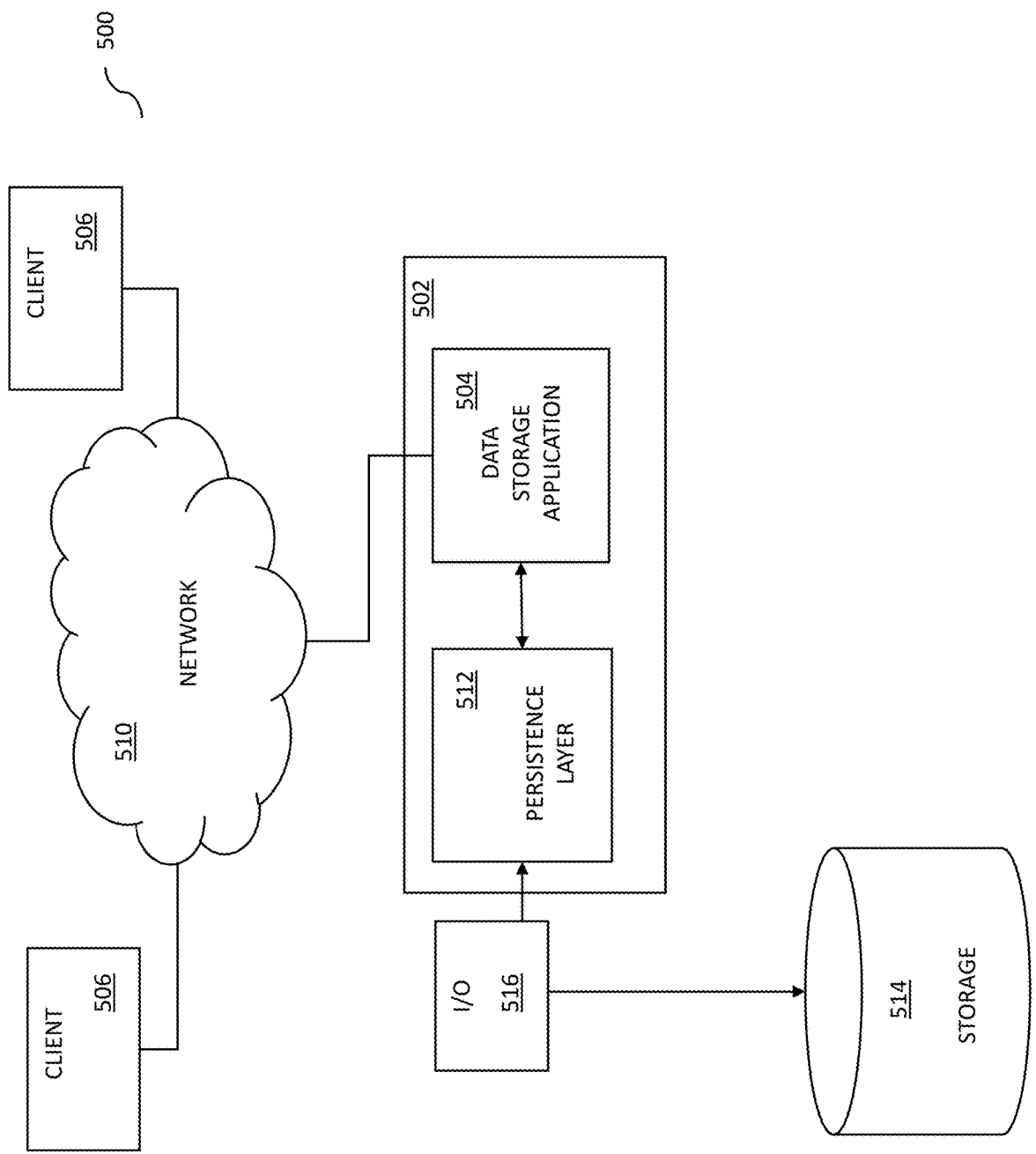
FIG. 5 is a diagram illustrating an exemplary system including a data storage application, according to some implementations of the current subject matter.

FIG. 5 illustrates an exemplary system 500 in which a computing system 502, which may include one or more programmable processors that may be collocated, linked over one or more networks, etc., executes one or more modules, software components, or the like of a data storage application 504, according to some implementations of the current subject matter. The data storage application 504 may include one or more of a database, an enterprise resource program, a distributed storage system (e.g. NetApp Filer available from NetApp of Sunnyvale, CA), or the like.

The one or more modules, software components, or the like may be accessible to local users of the computing system 502 as well as to remote users accessing the computing system 502 from one or more client machines 506 over a network connection 510. One or more user interface screens produced by the one or more first modules may be displayed to a user, either via a local display or via a display associated with one of the client machines 506. Data units of the data storage application 504 may be transiently stored in a persistence layer 512 (e.g., a page buffer or other type of temporary persistency layer), which may write the data, in the form of storage pages, to one or more storages 514, for example via an input/output component 516. The one or more storages 514 may include one or more physical storage media or devices (e.g. hard disk drives, persistent flash memory, random access memory, optical media, magnetic media, and the like) configured for writing data for longer term storage. It should be noted that the storage 514 and the input/output component 516 may be included in the computing system 502 despite their being shown as external to the computing system 502 in FIG. 5.

Data retained at the longer term storage 514 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 6:
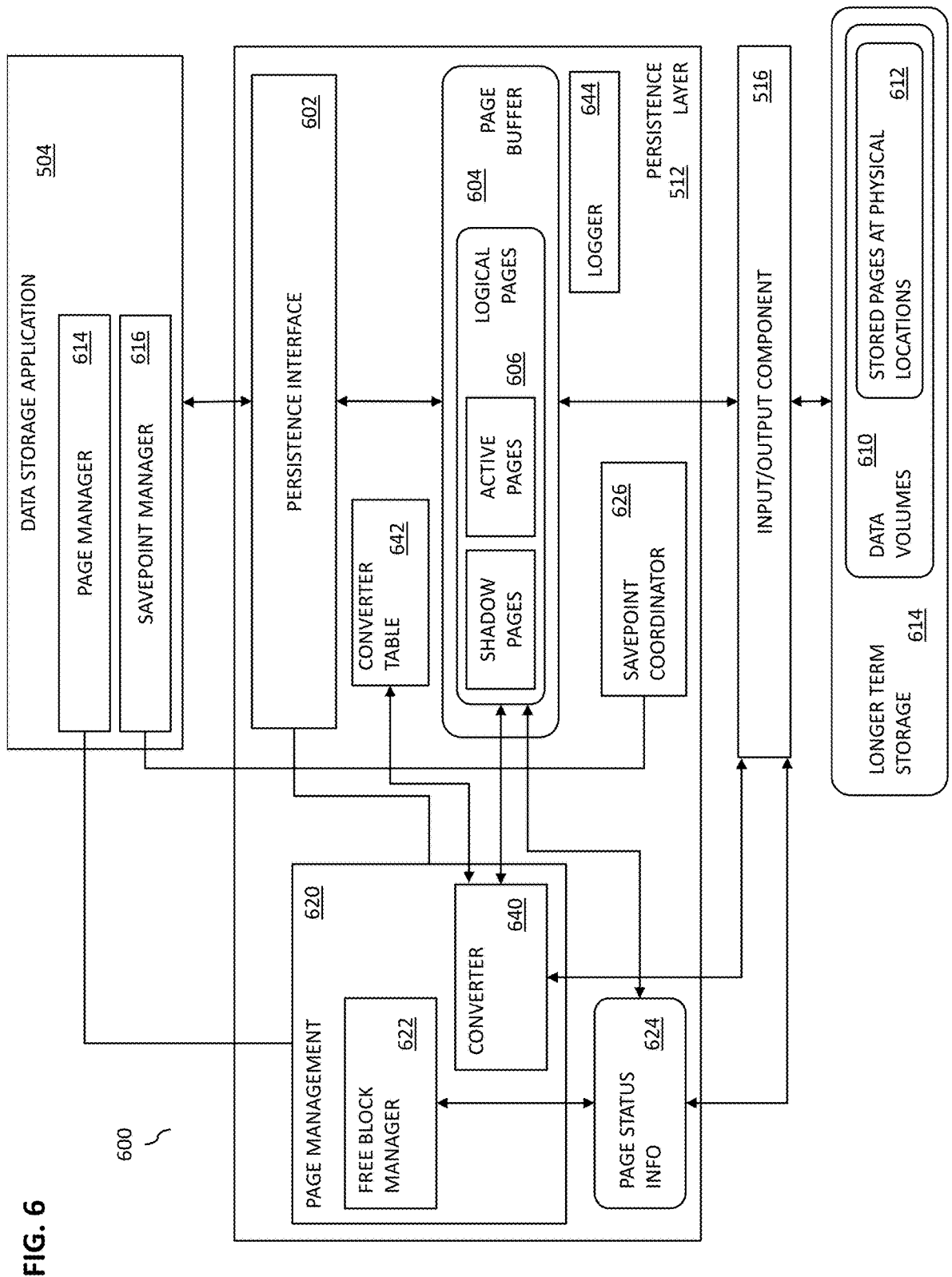
FIG. 6 is a diagram illustrating details of the system of FIG. 5.

FIG. 6 illustrates exemplary software architecture 600, according to some implementations of the current subject matter. A data storage application 504, which may be implemented in one or more of hardware and software, may include one or more of a database application, a network-attached storage system, or the like. According to at least some implementations of the current subject matter, such a data storage application 504 may include or otherwise interface with a persistence layer 512 or other type of memory buffer, for example via a persistence interface 602. A page buffer 604 within the persistence layer 512 may store one or more logical pages 606, and optionally may include shadow pages, active pages, and the like. The logical pages 606 retained in the persistence layer 512 may be written to a storage (e.g. a longer term storage, etc.) 514 via an input/output component 516, which may be a software module, a sub-system implemented in one or more of software and hardware, or the like. The storage 514 may include one or more data volumes 610 where stored pages 612 are allocated at physical memory blocks.

In some implementations, the data storage application 504 may include or be otherwise in communication with a page manager 614 and/or a savepoint manager 616. The page manager 614 may communicate with a page management module 620 at the persistence layer 512 that may include a free block manager 622 that monitors page status information 624, for example the status of physical pages within the storage 514 and logical pages in the persistence layer 512 (and optionally in the page buffer 604). The savepoint manager 616 may communicate with a savepoint coordinator 626 at the persistence layer 512 to handle savepoints, which are used to create a consistent persistent state of the database for restart after a possible crash.

In some implementations of a data storage application 504, the page management module of the persistence layer 512 may implement a shadow paging. The free block manager 622 within the page management module 620 may maintain the status of physical pages. The page buffer 604 may include a fixed page status buffer that operates as discussed herein. A converter component 640, which may be part of or in communication with the page management module 620, may be responsible for mapping between logical and physical pages written to the storage 514. The converter 640 may maintain the current mapping of logical pages to the corresponding physical pages in a converter table 642. The converter 640 may maintain a current mapping of logical pages 606 to the corresponding physical pages in one or more converter tables 642. When a logical page 606 is read from storage 514, the storage page to be loaded may be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 may ensure that changes made in the data storage application 504 are durable and that the data storage application 504 may be restored to a most recent committed state after a restart. Writing data to the storage 514 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 644 may also be included to store the changes made to the data of the data storage application in a linear log. The logger component 644 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 644 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 512 may use a combination of undo log entries (from one or more logs) and shadow paging.

The persistence interface 602 may handle read and write requests of stores (e.g., in-memory stores, etc.). The persistence interface 602 may also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 644 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 644 may write a database log (or simply referred to herein as a "log") sequentially into a memory buffer in natural order (e.g., sequential order, etc.). If several physical hard disks/storage devices are used to store log data, several log partitions may be defined. Thereafter, the logger 644 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 504 may use shadow paging so that the savepoint manager 616 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 7:
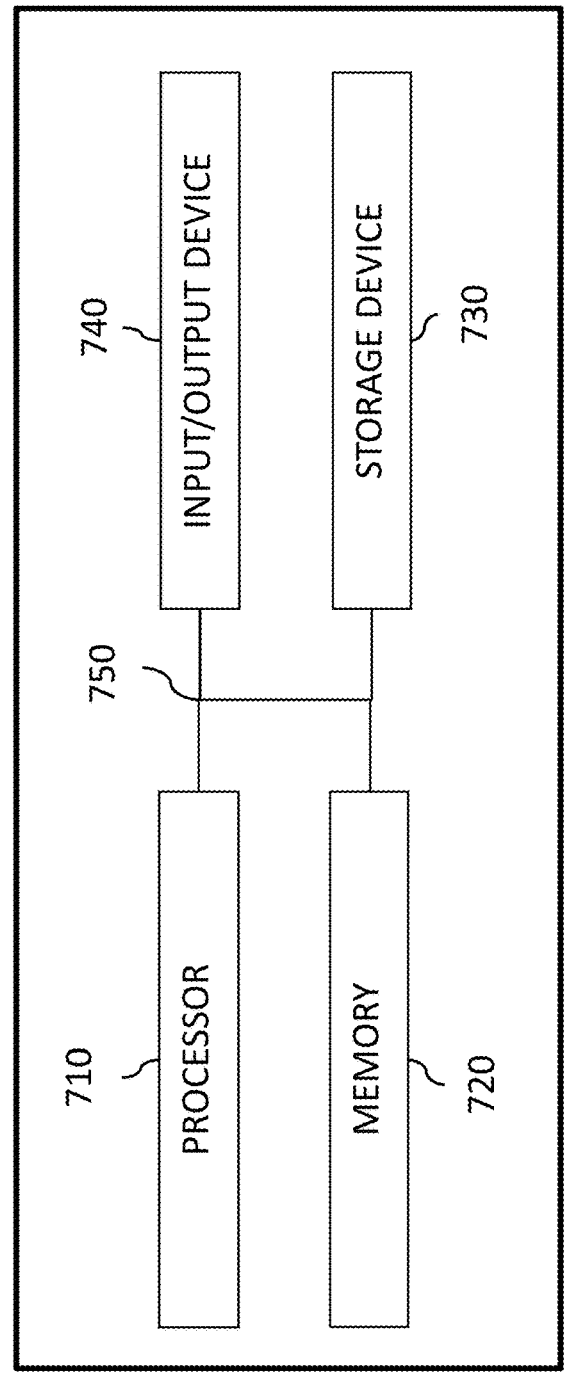
FIG. 7 is an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
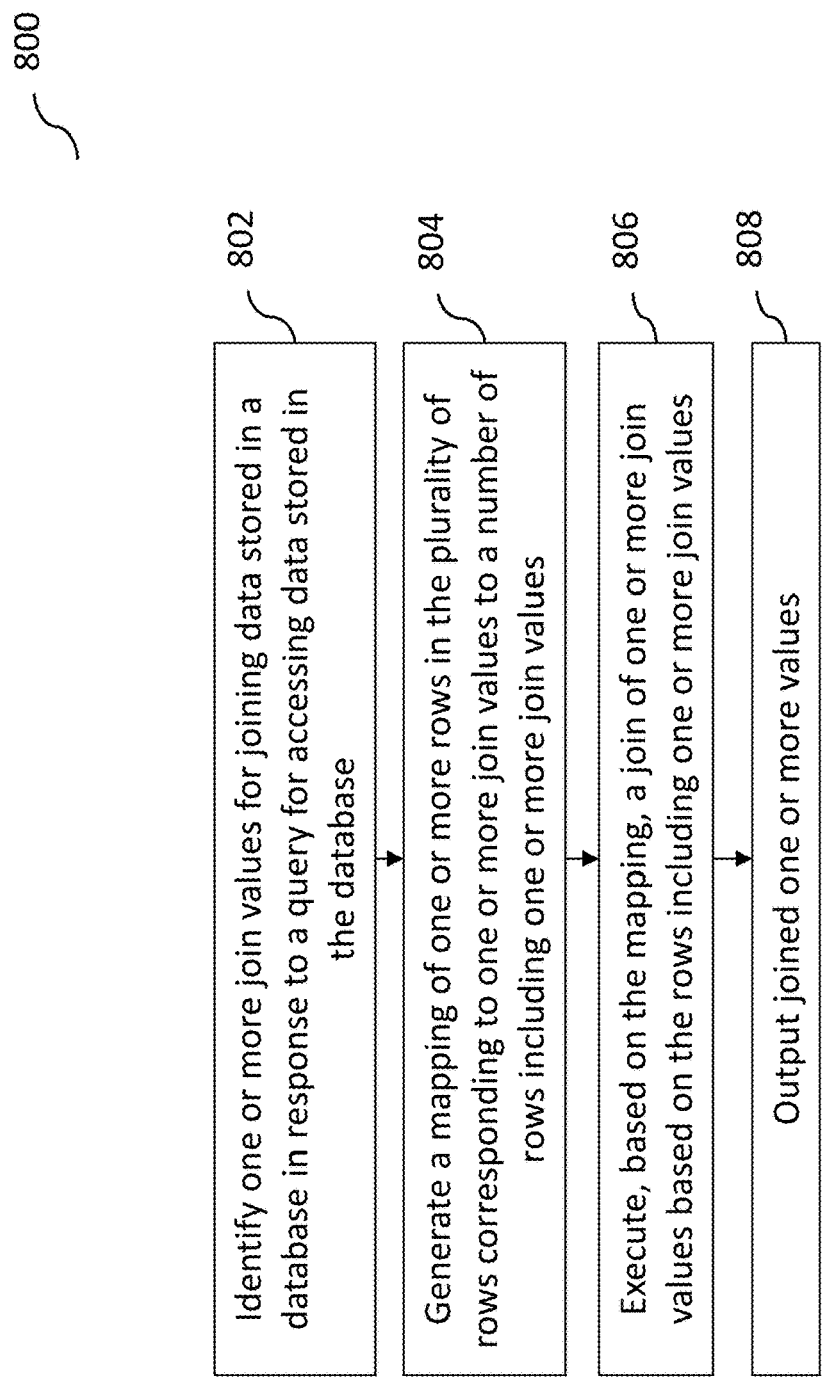
FIG. 8 is an exemplary method, according to some implementations of the current subject matter.

FIG. 8 illustrates an exemplary method 800 for executing a blocked index join in response to receiving a query on a database, according to some implementations of the current subject matter. The method 800 may be executed using one or more components of FIG. 1 and/or FIG. 2, and in particular, using the engine 204 and/or database 206.

At 802, the engine 204 may be configured to identify one or more join values (e.g., table 302) for joining data stored in a database (e.g., database 206) in response to a query for accessing data stored in the database (e.g., as received from one or more users 202). The database may store data in a plurality of tables. Each table may include a plurality of columns and a plurality of rows.

At 804, the engine 204 may generate a mapping (e.g., table 414) of one or more rows in the plurality of rows corresponding to one or more join values to a number of rows including the one or more join values. The engine 204 may then execute, based on the mapping, a join of the one or more join values based on the rows including the one or more join values, at 806. The joined one or more values (e.g., table 416) may be outputted using the engine 204, at 808.

In some implementations, the identifying may include identifying one or more unique values (e.g., table 406) in one or more join values, and executing a lookup of value identifiers (e.g., table 408) in one or more dictionaries associated with the database corresponding to the identified one or more unique values. In some implementations, the method 400 may further include determining one or more count values (e.g., table 410) associated with each of the value identifiers, and determining one or more row positions (e.g., table 412) in the plurality of rows corresponding to the determined count values and the corresponding value identifiers (e.g., table 408).

In some implementations, the generating may include determining the number of rows (e.g., table 414) based on the determined one or more row positions (e.g., table 412), and generating an index (e.g., start index in table 414) corresponding to the determined number of rows and generating the mapping using the generated index.

In some implementations, the method may further include generating a response to executing the query for accessing data stored in the database using the outputted joined one or more values.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    in response to a query, identifying one or more join values, the one or more join values corresponding to a block of columns for an index join, wherein the identifying further comprises identifying one or more unique join values in the one or more join values and using the one or more unique join values to identify one or more value identifiers corresponding to the identified one or more unique join values;
    determining one or more count values associated with each of the one or more value identifiers and further determining one or more row positions in a plurality of rows corresponding to the determined one or more count values and the one or more value identifiers;
    generating a mapping among the one or more count values, the one or more value identifiers, and the one or more row positions;
    executing, using the mapping, a join of the one or more join values; and
    outputting the joined one or more values.

2. The computer-implemented method of claim 1, wherein the query is associated with the index join over the block of columns.

3. The computer-implemented method of claim 2, wherein the query accesses data stored in a database, wherein the database stores data in a plurality of tables including a plurality of columns and the plurality of rows.

4. The computer-implemented method of claim 1, wherein identifying includes identifying the block of the one or more join values in a database.

5. The computer-implemented method of claim 1, wherein the identifying includes sorting the identified one or more unique values and executing a lookup of the one or more value identifiers in one or more dictionaries associated with a database corresponding to the sorted identified one or more unique values.

6. The computer-implemented method according of claim 1, wherein the generating includes generating a start index, and generating the mapping, using the generated start index.

7. The computer-implemented method of claim 1, further comprising generating a response to executing a query for accessing data stored in a database using the outputted joined one or more values.

8. A system comprising:
    at least one processor; and
    at least one memory storing instructions that, when executed by the at least one processor, cause the at least one processor to perform operations comprising:
        in response to a query, identifying one or more join values, the one or more join values corresponding to a block of columns for an index join, wherein the identifying further comprises identifying one or more unique join values in the one or more join values and using the one or more unique join values to identify one or more value identifiers corresponding to the identified one or more unique join values;
        determining one or more count values associated with each of the one or more value identifiers and further determining one or more row positions in a plurality of rows corresponding to the determined one or more count values and the one or more value identifiers;
        generating a mapping among the one or more count values, the one or more value identifiers, and the one or more row positions;
        executing, using the mapping, a join of the one or more join values; and
        outputting the joined one or more values.

9. The system of claim 8, wherein the query is associated with the index join over the block of columns.

10. The system of claim 9, wherein the query accesses data stored in a database, wherein the database stores data in a plurality of tables including a plurality of columns and the plurality of rows.

11. The system of claim 8, wherein identifying includes identifying the block of the one or more join values in a database.

12. The system of claim 8, wherein the identifying includes sorting the identified one or more unique values and executing a lookup of the one or more value identifiers in one or more dictionaries associated with a database corresponding to the sorted identified one or more unique values.

13. The system of claim 8, wherein the generating includes generating a start index, and generating the mapping, using the generated start index.

14. The system of claim 8, further comprising generating a response to executing a query for accessing data stored in a database using the outputted joined one or more values.

15. A non-transitory computer-readable storage medium including computer program code, which when executed by at least one processor, causes operations comprising:
- in response to a query, identifying one or more join values, the one or more join values corresponding to a block of columns for an index join, wherein the identifying further comprises identifying one or more unique join values in the one or more join values and using the one or more unique join values to identify one or more value identifiers corresponding to the identified one or more unique join values;
- determining one or more count values associated with each of the one or more value identifiers and further determining one or more row positions in a plurality of rows corresponding to the determined one or more count values and the one or more value identifiers;
- generating a mapping among the one or more count values, the one or more value identifiers, and the one or more row positions;
- executing, using the mapping, a join of the one or more join values; and
- outputting the joined one or more values.

16. The non-transitory computer-readable storage medium of claim 15, wherein the query is associated with the index join over the block of columns.

17. The non-transitory computer-readable storage medium of claim 16, wherein the query accesses data stored in a database, wherein the database stores data in a plurality of tables including a plurality of columns and the plurality of rows.

18. The non-transitory computer-readable storage medium of claim 15, wherein identifying includes identifying the block of the one or more join values in a database.

19. The non-transitory computer-readable storage medium of claim 15, wherein the identifying includes sorting the identified one or more unique values and executing a lookup of the one or more value identifiers in one or more dictionaries associated with a database corresponding to the sorted identified one or more unique values.

20. The non-transitory computer-readable storage medium of claim 15, wherein the generating includes generating a start index, and generating the mapping, using the generated start index.

* * * * *